Figure 1:
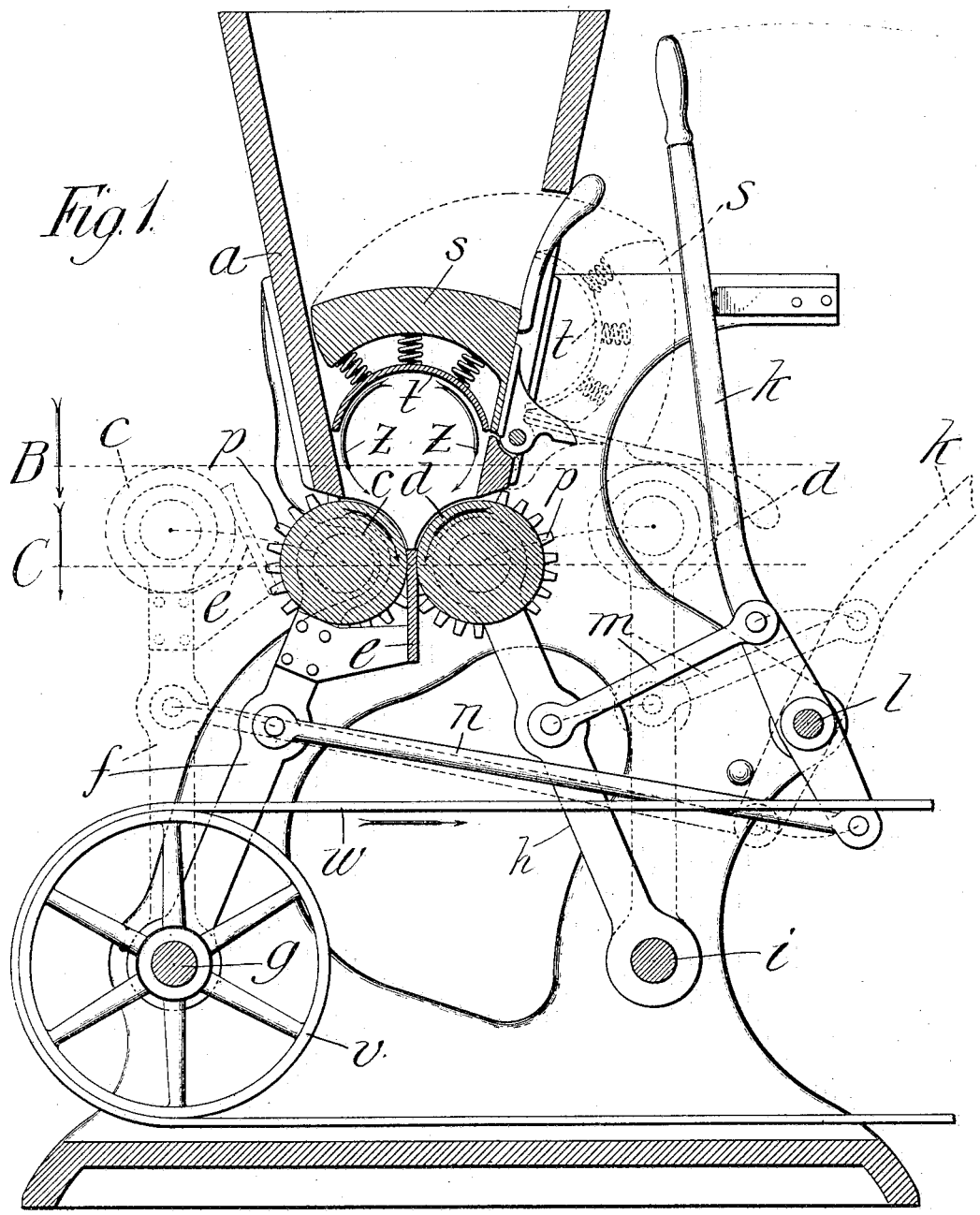

No. 766,431. PATENTED AUG. 2, 1904.
C. F. DIETZ.
METHOD OF FORMING DOUGH.
APPLICATION FILED NOV. 30, 1903.
NO MODEL. 2 SHEETS—SHEET 1.

Witnesses:

Inventor,
Christian F. Dietz,
By Dyrenforth, Dyrenforth & Lee,
Attys.

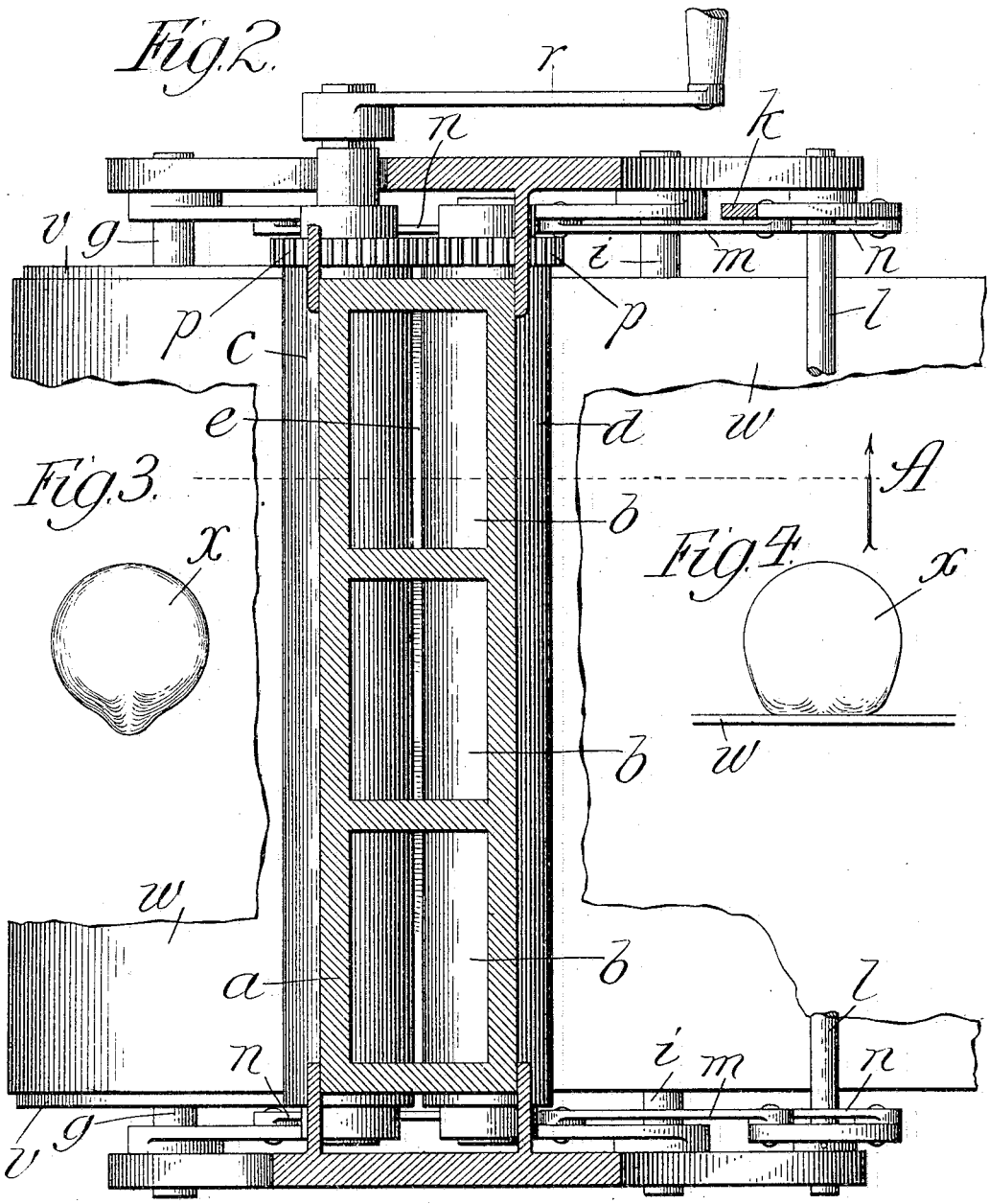

No. 766,431. Patented August 2, 1904.

UNITED STATES PATENT OFFICE.

CHRISTIAN F. DIETZ, OF CHICAGO, ILLINOIS, ASSIGNOR OF TWO-THIRDS TO AUGUST JUNGE, OF CHICAGO, ILLINOIS, AND PHILLIP F. CARROLL, OF JOLIET, ILLINOIS.

METHOD OF FORMING DOUGH.

SPECIFICATION forming part of Letters Patent No. 766,431, dated August 2, 1904.

Application filed November 30, 1903. Serial No. 183,147. (No model.)

*To all whom it may concern:*

Be it known that I, CHRISTIAN F. DIETZ, a citizen of the United States, residing at Chicago, in the county of Cook and State of Illinois, have invented a new and Improved Method of Forming Dough, of which the following is a specification.

My invention relates to an improved method of forming dough into loaves preparatory to baking it into bread.

My object is to provide an improved method in the practice of which the dough may be quickly formed as desired and result, when baked in loaves or the like, of bread of practically uniform consistency throughout, particularly smooth in appearance, and of a desirable quality which, so far as I am aware, cannot be produced in any other manner.

My invention consists in the improved method hereinafter set forth and also in the loaf or the like of bread as a new article of manufacture produced by the method.

In order to practice my improved method and produce the desired results with certainty in each instance, special mechanical appliances should preferably be employed, and for this reason and to render an explanation of my method particularly clear I show in the accompanying drawings a machine of one desirable form capable of use in carrying out my invention.

In the drawings, Figure 1 is a vertical cross-section of said machine, the section being taken on line A in Fig. 2; Fig. 2, a broken plan section in different planes taken on the lines B C in Fig. 1; and Figs. 3 and 4, end views of a loaf, illustrating the results of my method, showing in the first instance the appearance of a loaf of dough as it is finished in the machine and in the second instance the appearance of the loaf preparatory to going into the oven.

In carrying out my invention a lump of dough of the desired degree of plasticity and of the desired size for the particular loaf to be formed is dropped into a hopper to rest in contact with, preferably, a pair of oppositely-rotating rollers moving in the direction of the bite at the upper side. Between the rollers is a stationary filler or scraper which operates to prevent dough from being drawn between the rollers during their rotation. In the rotation of the rollers the surface portion of the mass or lump of dough is drawn by the rollers in the direction of the dividing space between the rollers and then discharged upward into the mass. This operation of the rollers and the rather stiff plastic and adhesive nature of the dough result in a peculiar action upon the mass. The outer skin portion of the dough is drawn from about the top center line of the mass circumferentially downward, as indicated by the arrows in Fig. 1, giving the appearance of stretching without breaking the skin portion of the loaf, while reducing the mass transversely to a more or less extent and eliminating gas globules. The longer this operation is kept up the more compact the mass becomes, even without the employment of a weight upon the dough. I prefer, however, to impose upon the upper surface of the mass a weight concave on its under side to maintain the mass with sufficient firmness against the rollers and also by contact with the upper side contribute toward the preventing of the breaking of the skin under the stretching operation of the dough produced by the rollers.

The machine, as shown in the drawings, is designed to produce with each operation three oblong loaves of dough each approximately of the same area in cross-section throughout. A hopper $a$ is divided into three compartments $b\ b\ b$. Smooth rollers $c\ d$ extend the full length of the hopper $a$, and $e$ is a scraper, with the opposite sides of which the rollers contact. The roller $c$ is journaled at opposite ends in levers $f$ on a rock-shaft $g$, and they carry the scraper $e$, and the roller $d$ is journaled in levers $h$, fulcrumed upon a rock-shaft $i$. An operating-lever $k$, fulcrumed at $l$, is connected by a link $m$ with one lever $h$ and by a link $n$ with one lever $f$. The rollers $c\ d$ carry pinions $p$, which intermesh when the rollers are closed together, and the roller $c$ is provided with an operating-crank $r$. At each compartment $b$ is a weight $s$, having a spring-carried yielding concave and smooth under surface portion $t$, and the weight may be swung from the position shown by full lines to that indicated by dotted lines. Journaled on the shaft $g$ is a drum $v$, over which runs an endless horizontally-extending belt $w$ of the full width of the hopper $a$.

In practice the weights $s$ are first swung out of the way, and lumps $x$, of dough of the desired size, are dropped into the hopper-sections upon the rollers. The weights are then swung into position to bear at their surfaces $t$ upon the lumps and press them against the rollers. The crank $r$ is then turned to rotate the rollers in opposite directions, as indicated by the arrows thereon. The surface or skin portion of the lump of dough is drawn, as indicated by the arrows $z\ z$ in Fig. 1, by the frictional engagement therewith of the rollers toward the scraper $e$, which prevents dough from passing downward between the rollers and causes it to be discharged upward into the mass. Thus, as before explained, the skin portion of the lump is stretched and drawn downward toward the under center line of the loaf from about the center line at the top equally on opposite sides. This effects a peculiar kneading and contracting action which while smoothing the outer surface of the lump or loaf expels gas globules and compacts the mass, which takes the form of the mold produced by the end and side walls of the compartment $b$ and smooth surface $t$ of the weight. As a rule the action of the rollers upon the mass need be prolonged but a few moments—say during but a single revolution thereof—to effect the desired results, though the extent of this operation will depend largely upon the condition of the dough. When the lump has been acted upon by the rollers to the extent desired, the lever $k$ may be swung outward, causing the rollers $c\ d$ and scraper $e$ to be moved to the positions indicated by dotted lines, when the loaves will drop from the compartments onto the traveling belt $w$ and be discharged thereby from the machine.

My invention is intended for use only in the production of loaves or the like that are not circular in horizontal cross-section, but of the characteristic square or oblong shapes; also in forming what are generally known as "Vienna" loaves or rolls, which taper to opposite ends.

The gist of my invention in its practical application lies in subjecting a lump of dough to the action of a frictionally-engaging surface moving in one direction to draw and stretch the surface or skin portion of the loaf toward and apply it to, as by depositing it in, what may be termed the "base" of the finished loaf in forming a loaf non-circular in horizontal cross-section, and while I have produced the best results by subjecting the dough to the action of two rotating surfaces operating in the manner described the invention is not to be limited to this particular means for practicing the method as defined by the claims.

What I claim as new, and desire to secure by Letters Patent, is—

1. The herein-described method of preparing a loaf from a lump of dough, which consists in drawing the surface of the lump toward one side thereof, thereby stretching the skin portion, applying the surplus skin to the said side, and simultaneously with the stretching, compacting the lump.

2. The herein-described method of preparing a loaf, non-circular in horizontal cross-sections, from dough, which consists in frictionally stretching and drawing the skin portion of a lump of dough toward, and applying it to, the side intended to form the under side of the finished loaf, and, simultaneously with the stretching, compacting the lump, substantially as set forth.

3. The herein-described method of preparing a loaf, non-circular in horizontally cross-sections, from dough, which consists in frictionally stretching and drawing the skin portion of the lump of dough, while under pressure, toward, and applying it to, the side intended to form the under side of the finished loaf, and, simultaneously with the stretching, compacting the lump, substantially as set forth.

4. The herein-described method of preparing a loaf, non-circular in horizontally cross-sections, from dough, which consists in frictionally stretching and drawing the skin portion of a lump of dough simultaneously at opposite sides, and applying the surplus skin to, one side of the lump, and, simultaneously with the stretching, compacting the lump, substantially as set forth.

5. The method of preparing a loaf from dough, which consists in subjecting a lump of dough to the friction action of surfaces moving simultaneously against opposite sides of the lump, to draw and stretch the skin portion of the lump and apply the surplus thereof to one side of the lump, and, simultaneously with the stretching, compacting the lump, substantially as set forth.

6. The method of preparing a loaf from dough, which consists in subjecting a lump of dough to a rotary frictional action against opposite sides and toward one side thereof, thereby drawing and stretching the skin portion of the lump and compacting the lump, and, during the stretching operation applying the surplus skin, resulting therefrom to the said one side of the loaf, substantially as and for the purpose set forth.

CHRISTIAN F. DIETZ.

In presence of—
F. M. WIRTZ,
WALTER N. WINBERG.